(12) United States Patent
Wellbrock et al.

(10) Patent No.: US 8,792,784 B2
(45) Date of Patent: Jul. 29, 2014

(54) TERRESTRIAL OPTICAL FIBER COMMUNICATION WITH ADDED CAPACITY

(75) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 377 days.

(21) Appl. No.: 13/048,257

(22) Filed: Mar. 15, 2011

(65) Prior Publication Data

US 2012/0237215 A1 Sep. 20, 2012

(51) Int. Cl.
*H01S 3/30* (2006.01)
*G08B 21/00* (2006.01)
*H01B 7/14* (2006.01)

(52) U.S. Cl.
USPC ............... 398/37; 398/9; 398/25; 398/157; 359/334

(58) Field of Classification Search
USPC .......................................... 398/37, 157, 1, 25
See application file for complete search history.

(56) References Cited

U.S. PATENT DOCUMENTS

| | | | |
|---|---|---|---|
| 6,529,316 B1 * | 3/2003 | Treyz et al. | 359/337.11 |
| 6,625,347 B1 * | 9/2003 | Wu | 385/27 |
| 7,440,164 B2 * | 10/2008 | Eiselt | 359/334 |
| 2003/0062187 A1 * | 4/2003 | Pitrone et al. | 174/70 S |
| 2009/0244840 A1 * | 10/2009 | Takawa et al. | 361/695 |

OTHER PUBLICATIONS

Essiambre, Rene-Jean et al., "Capacity Limits of Optical Fiber Networks", Journal of Lightwave Technology, vol. 28, No. 4, Feb. 15, 2010, pp. 662-701.
Kaminow, Ivan P. et al., Erbium-Doped Fiber Amplifiers, Optical Fiber Communications IIIB, Academic Press, pp. 36-37, Apr. 1997.

* cited by examiner

*Primary Examiner* — Oommen Jacob

(57) ABSTRACT

An optical communication system comprising an optical fiber connected to a first signal regeneration node located at a first end of the optical fiber and a second signal regeneration node located at a second end of the optical fiber; intermediary nodes located between the first and second signal regeneration nodes, wherein one or more pairs of adjacent intermediary nodes each define a span distance along the optical fiber; and one or more Raman amplifiers located within each span distance along the optical fiber, wherein at least one of the one or more Raman amplifiers comprises a case that encases one or more lasers and a temperature controller comprising a temperature sensor to monitor a temperature of the one or more lasers; and a temperature regulator to control a temperature of the one or more lasers.

16 Claims, 5 Drawing Sheets

TERRESTRIAL OPTICAL FIBER COMMUNICATION WITH ADDED CAPACITY

BACKGROUND

With traffic demands continually increasing, optical network operators are confronted with a host of challenges to accommodate these traffic demands.

DETAILED DESCRIPTION OF PREFERRED EMBODIMENTS

Figure 1:
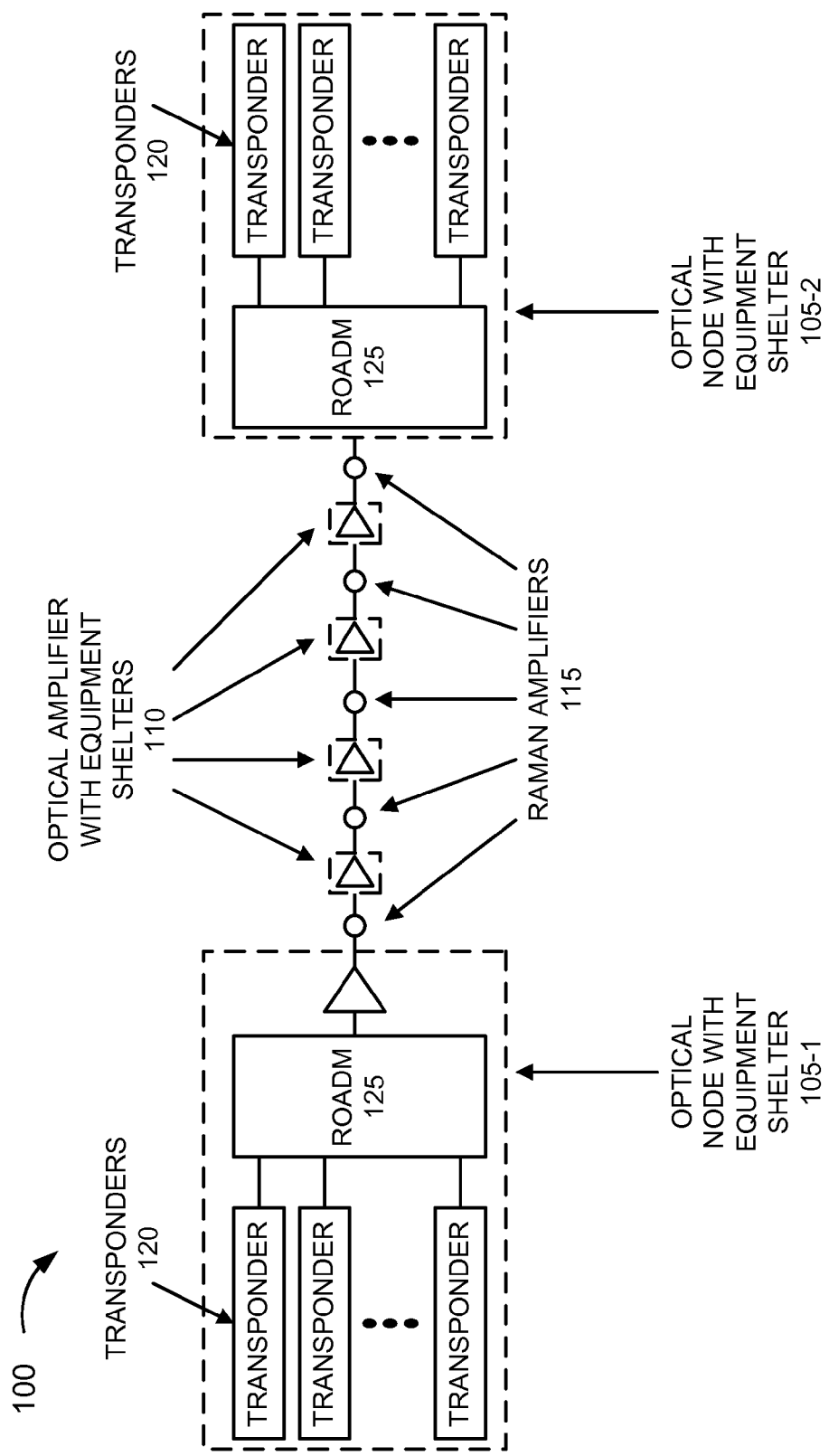
FIG. 1 is a diagram illustrating an exemplary embodiment of a terrestrial optical fiber communication system.

The following detailed description refers to the accompanying drawings. The same reference numbers in different drawings may identify the same or similar elements. Also, the following detailed description does not limit the invention.

As traffic demands continually increase, optical communication systems must correspondingly increase their capacity. However, upgrading the capacity of an existing optical network may be costly and involve replacing in-ground fibers, amplifiers, etc. In this regard, optical communication systems, such as long-haul optical communication systems, may eventually reach their capacity limits. By way of an example, a long-haul optical communication system, in which signal regeneration occurs, for example, every 2000 kilometers (km), has an 80 km span distance, with 50 Gigahertz (GHz) of channel spacing and 38 GHz of optical bandwidth, may have a total fiber capacity of 20 Terabits/second (Tb/s) for 10 Terahertz (THz) of bandwidth. However, as next-generation optical networks are foreseen to support 100 Gigabits/s (Gb/s) channels, existing infrastructures are taxed to support this performance metric given the available bandwidth.

According to an exemplary embodiment, a fiber-optic communication system may include a distributed Raman amplification system along a fiber-optic path. For example, one or more Raman amplifiers may be located between nodal spans along the fiber-optic path of the fiber-optic communication system. According to an exemplary implementation, the Raman amplifiers may be counter-propagating Raman amplifiers. According to another exemplary implementation, the Raman amplifiers may be co-propagating Raman amplifiers. According to an exemplary embodiment, the number of modulation levels (i.e., the modulation format) used by the fiber-optic communication system may be increased based on an increase of optical signal-to-noise ratio (OSNR) provided by the distributed Raman amplification system. In this way, the capacity/spectral efficiency (i.e., bits/second per unit of bandwidth) is increased.

According to an exemplary implementation of the distributed Raman amplification system, a Raman amplifier may be placed in a location between nodal spans in which equipment shelter is not available. For example, the Raman amplifier may be placed in a manhole, a handhole, or some other unprotected environment. According to an exemplary embodiment of a Raman amplifier, the Raman amplifier may include a temperature controller. The temperature controller may regulate the temperature of a laser so that the Raman amplifier operates within a particular temperature range and in accordance with specifications (e.g., manufacturer specifications, etc.) pertaining to the Raman amplifier.

According to an exemplary embodiment, the Raman amplifier may include a water-resistant or a water-proof sealed case. The water-resistant/water-proof case may prevent water seepage into the Raman amplifier (e.g., if the Raman amplifier is placed in the ground, etc.), as well as protection from foreign elements and/or other types of environmental conditions (e.g., vibration, etc.). Additionally, according to an exemplary embodiment, the Raman amplifier may include connectors (e.g., fiber and power connectors) that are sealed to prevent water seepage.

According to an exemplary embodiment, a fiber-optic communication system may include nodes, along a fiber-optic path, that include power detectors to measure optical signal power pertaining to optical signals propagating along the fiber-optic path. According to an exemplary implementation, the nodes may be placed upstream and downstream from the Raman amplifier. The power detectors may measure the signal power of an optical signal propagating in the fiber-optic path. The fiber-optic communication system may use measured signal power values to determine whether the Raman amplifier is operating properly. For example, if there is a signal power drop, it may be determined that the Raman amplifier is not operating properly. Additionally, according to an exemplary implementation, the points along the fiber-optic path in which the measurements take place may permit identifying and/or locating a particular Raman amplifier.

FIG. 1 is a diagram illustrating an exemplary embodiment of a terrestrial optical fiber communication system 100. As illustrated, terrestrial optical fiber communication system 100 may include optical node with equipment shelters 105-1 and 105-2 (referred to individually as optical node 105, or optical nodes 105), optical amplifier with equipment shelters 110 (referred to individually as optical amplifier 110, or optical amplifiers 110), and Raman amplifiers 115 (also referred to as Raman amplifier 115, individually). Optical nodes 105, optical amplifiers 110, and Raman amplifiers 115 may be communicatively coupled via an optical fiber.

The number of devices and configuration in terrestrial optical fiber communication system 100 is exemplary and provided for simplicity. According to other embodiments, terrestrial optical fiber communication system 100 may include additional devices, fewer devices, different devices, and/or differently arranged devices than those illustrated in FIG. 1. For example, terrestrial optical fiber communication system 100 may correspond to a segment of a long haul optical network having hundreds or thousands of nodes (e.g., devices), in which various segments of the optical network may correspond to one or more exemplary embodiments described herein.

As illustrated, optical node 105 may include, among other things, multiple optical transponders 120 and a multiplexer 125 (e.g., a Reconfigurable Optical Add-Drop Multiplexer (ROADM)). Transponders 120 may include (although not illustrated), for example, optical transmitters and optical receivers, or optical transceivers, and optical modulators/demodulators. Optical nodes 105 may be connected by optical fiber(s). Along the fiber-optic path, optical amplifiers 110 may be placed, which for long haul fiber-optic paths, typically are sheltered from the environment. Optical amplifiers 110 may include, for example, Erbium Doped Fiber Amplifiers (EDFAs), a combination of EDFAs and Raman amplifiers, or other suitable optical amplifiers.

Additionally, according to an exemplary embodiment, terrestrial optical fiber communication system 100 may include Raman amplifiers 115. According to an exemplary implementation, a Raman amplifier 115 may be located midpoint between optical amplifiers 110. According to other implementations, multiple Raman amplifiers 115 may be located between optical amplifiers 110 (e.g., splitting the span into three thirds, etc.). According to an exemplary implementation, Raman amplifiers 115 may provide counter-propagating Raman amplification. According to another exemplary implementation, Raman amplifiers 115 may provide co-propagating Raman amplification, a combination thereof, etc.

Based on the above configuration (i.e., by cutting the span between optical amplifiers 110), the OSNR may be increased along the fiber-optic path. As a result, terrestrial optical fiber communication system 100 may accommodate higher modulation levels relative to a terrestrial optical fiber communication system that does not include Raman amplifiers 115.

By way of example, assume that the fiber-optic path distance between optical amplifiers 110 is 80 kilometers, with a total fiber-optical path distance of 2,000 km (i.e., between optical nodes 105). The OSNR may be calculated based on the following exemplary expression:

$$\text{OSNR(dB)} = -10 \log_{10}(hv\nabla f) + P_{TX} - L(\text{dB}) - NF(\text{dB}) - 10 \log_{10}(N), \text{ in which} \quad (1)$$

h=Planck's constant ($6.6260 \ast 10^{-34}$);
v=optical frequency constant (193 THz);
$\nabla$f=bandwidth constant that measures the NF (0.1 nm or 12.5 GHz);
$P_{TX}$ is the power of the transmitter;
L is the span loss in dB;
NF is the noise figure in dB; and
N is the number of amplified spans.

Based on the above expression, and exemplary values in this example, the OSNR may be expressed as:

$$\text{OSNR} = 58 + 0 - 20 - 40 - 10 \log(25) = 20 \text{ dB, where:} \quad (2)$$

$10 \log_{10}(hv\nabla f) = 58$
$P_{TX} = 0$ dBm
L=20 dB for 80 km
NF=4 dB
N=25 for 2,000 km reach However, for this example, if the span between optical amplifiers 110 is cut in half to a distance of 40 km, the OSNR may be expressed as:

$$\text{OSNR} = 58 + 0 - 20 - 40 - 10 \log(50) = 27 \text{ dB} \quad (3)$$

As illustrated by the above, there is an increase in OSNR by 7 dB. Based on this increase of the OSNR, the number of modulation levels may be increased. For example, terrestrial optical network system 100 may configure its modulation format from dual-polarization Quadrature Phase Shift Keying (QPSK) to dual-polarization 16-Quadrature Amplitude Modulation (16-QAM), which in turn, increases the capacity of terrestrial optical fiber communication system 100. For example, an optical fiber communication system supporting 10 Terahertz of bandwidth, having a span distance of 80 km, with a 2000 km reach, 38 GHz of optical bandwidth, 50 GHz of channel spacing, and using a dual-polarization QPSK modulation scheme, may yield a spectral efficiency of 2 bits/s/Hz. However, an optical fiber communication system supporting 10 Terahertz of bandwidth, having a span distance of 40 km, a reach of 2000 km, 175 GHz of bandwidth, 200 GHz of channel spacing, and using the dual-polarization 16-QAM, may yield a spectral efficiency of 4 bits/s/Hz, and may support a 100-Gb/s channel that occupies 12.5 GHz of bandwidth.

Typically, the addition of optical amplifiers implemented in an optical network is to extend the distance of the optical network. However, according to an exemplary embodiment, the addition of Raman amplifiers 115 may increase the OSNR, while maintaining the reach or distance of terrestrial optical fiber communication system 100. Based on the increase of OSNR, terrestrial optical fiber communication system 100 may be configured with a greater number of modulation levels to achieve a higher spectral efficiency. For example, transponders 120 may include optical modulators/demodulators to modulate/demodulate optical signals in accordance with the dual-polarization 16-QAM format.

Figure 2:
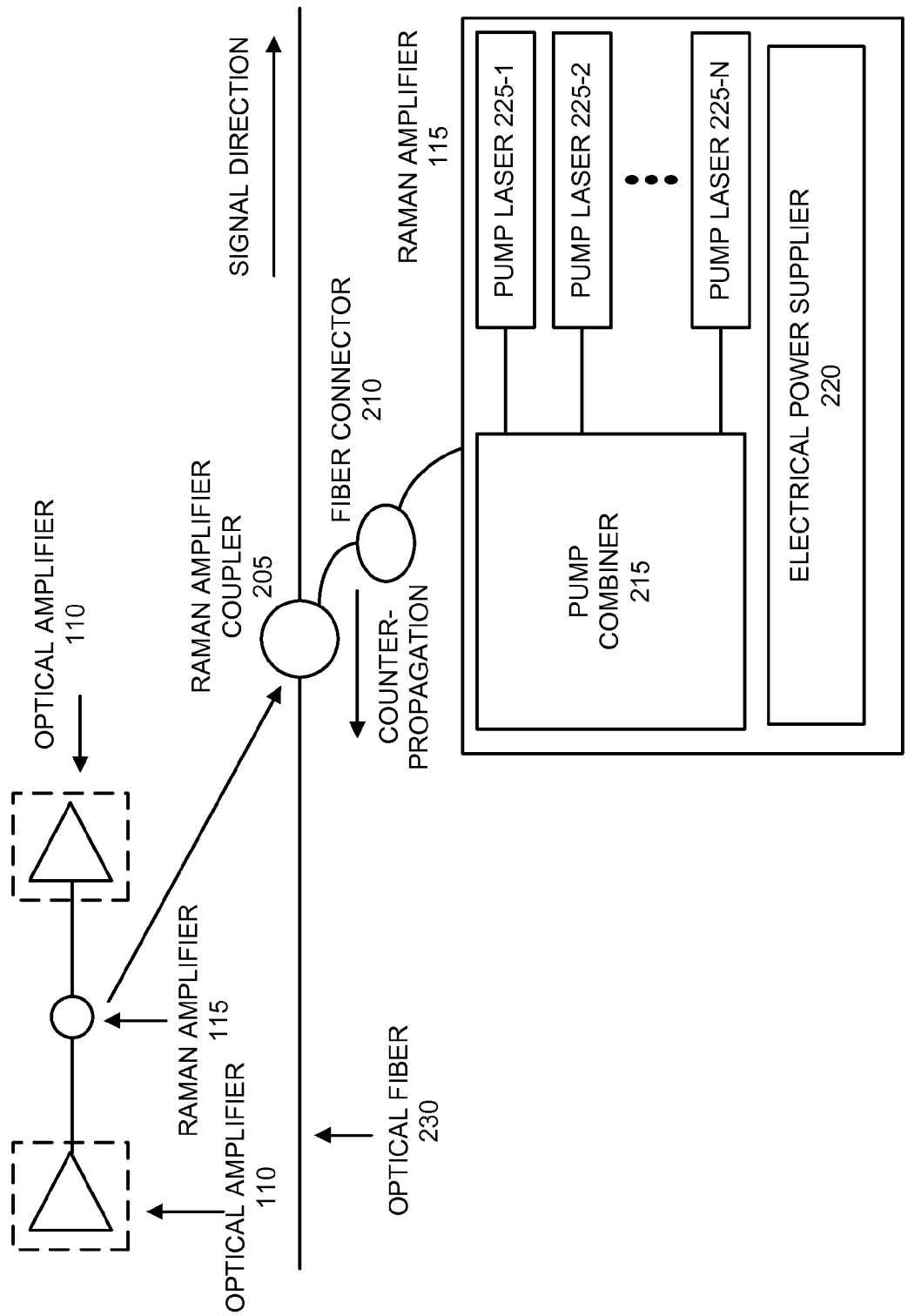
FIG. 2 is a diagram illustrating an exemplary configuration for an exemplary embodiment of a Raman amplifier.

FIG. 2 is a diagram illustrating an exemplary configuration for an exemplary embodiment of Raman amplifier 115. As illustrated, a Raman coupler 205 and a fiber connector 210 may couple Raman amplifier 115 to an optical fiber 230. In this example, counter-propagating Raman amplification may be provided by Raman amplifier 115. According to an exemplary implementation, Raman amplifier 115 may include a pump combiner 215, an electrical power supplier 220, and pump lasers 225-1 through 225-N. As previously described, depending on where along optical fiber 230 span Raman amplifier 115 is placed, Raman amplifier 115 may be placed in a location in which equipment shelter may not be available. For example, Raman amplifier 115 may be placed in a manhole, a handhole, etc. Under these circumstances, Raman amplifier 115 may not have the benefit of a controlled environment and protection from environmental elements.

Figure 3:
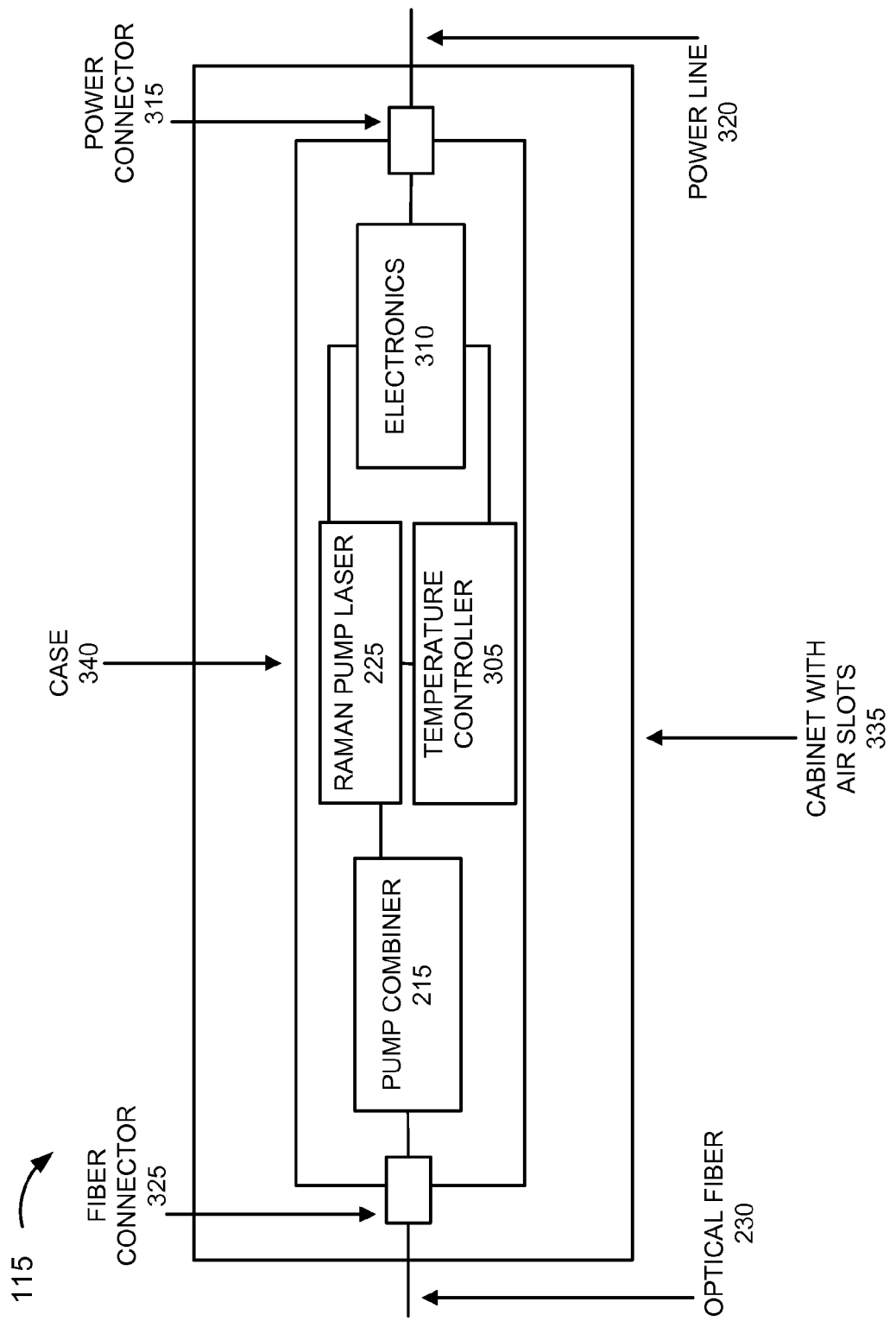
FIG. 3 is a diagram illustrating an exemplary embodiment of a Raman amplifier.

As previously described, according to an exemplary embodiment, Raman amplifier 115 may include a temperature controller, a water-resistant or a water-proof case, and sealed connectors. FIG. 3 is a diagram illustrating an exemplary embodiment of Raman amplifier 115. As illustrated, Raman amplifier 115 may include a temperature controller 305, a power connector 315, a fiber connector 325, a cabinet 335, and a case 340.

Temperature controller 305 may include a temperature sensor and a temperature controller element. Temperature controller 305 may control the temperature of a laser (e.g., Raman pump laser 225) of Raman amplifier 115 based on a temperature sensed by the temperature sensor. According to an exemplary implementation, the temperature sensor may detect temperature with respect to the laser(s). According to another exemplary implementation, the temperature sensor may detect temperature with respect to the laser(s), as well as ambient temperature. Temperature controller 305 may cool or heat the laser based on sensed temperature(s) so that the laser(s) operate(s) within a particular temperature range. Depending on the type of laser(s) (e.g., semiconductor laser, Raman fiber laser, etc.), the process for cooling or heating the laser(s) may be different. However, temperature controller 305 may cool or heat the laser(s) according to conventional techniques.

Power connector 315 may connect Raman amplifier 115 to a power line 320, which may supply Raman amplifier 115 with electricity. Fiber connector 325 may connect Raman amplifier 115 to optical fiber 230. According to an exemplary embodiment, power connector 315 and fiber connector 325 may be water-tight (e.g., sealed) connectors to prevent water seepage. As illustrated in FIG. 3, according to an exemplary embodiment, power connector 315 and fiber connector 325 may be coupled or sealed to case 340. However, according to other embodiments, power connector 315 and/or fiber connector 325 may be coupled or sealed to cabinet 335 and case 340, or just cabinet 335.

Cabinet 335 may be an outer enclosure or encasing suitable to protect the inner components of Raman amplifier 115. Cabinet 335 may include air slots to assist in balancing the ambient temperature surrounding internal components of Raman amplifier 115. Case 340 may be an inner enclosure or encasing to protect the inner components of Raman amplifier 115. Case 340 may be made from a suitable material, such as metal, to facilitate heat exchange between the internal components and their external environment. Additionally, as previously described, Raman amplifier 115 may be water-resistant/proof. For example, case 340 may minimize or prevent water seepage into Raman amplifier 115.

With the addition of Raman amplifiers 115 in terrestrial optical fiber communication system 100, their performance should be monitored, as is the case with other nodes or devices in an optical network. According to an exemplary embodiment, optical amplifiers 110 may include power detectors to permit monitoring of Raman amplifiers. According to such an implementation, each Raman amplifier site may remain simple and may not require additional components to communicate with an optical network control system, which is typically deployed to monitor network performance, status, and provide other network management assistance to network operators, network administrators, etc.

Figure 4:
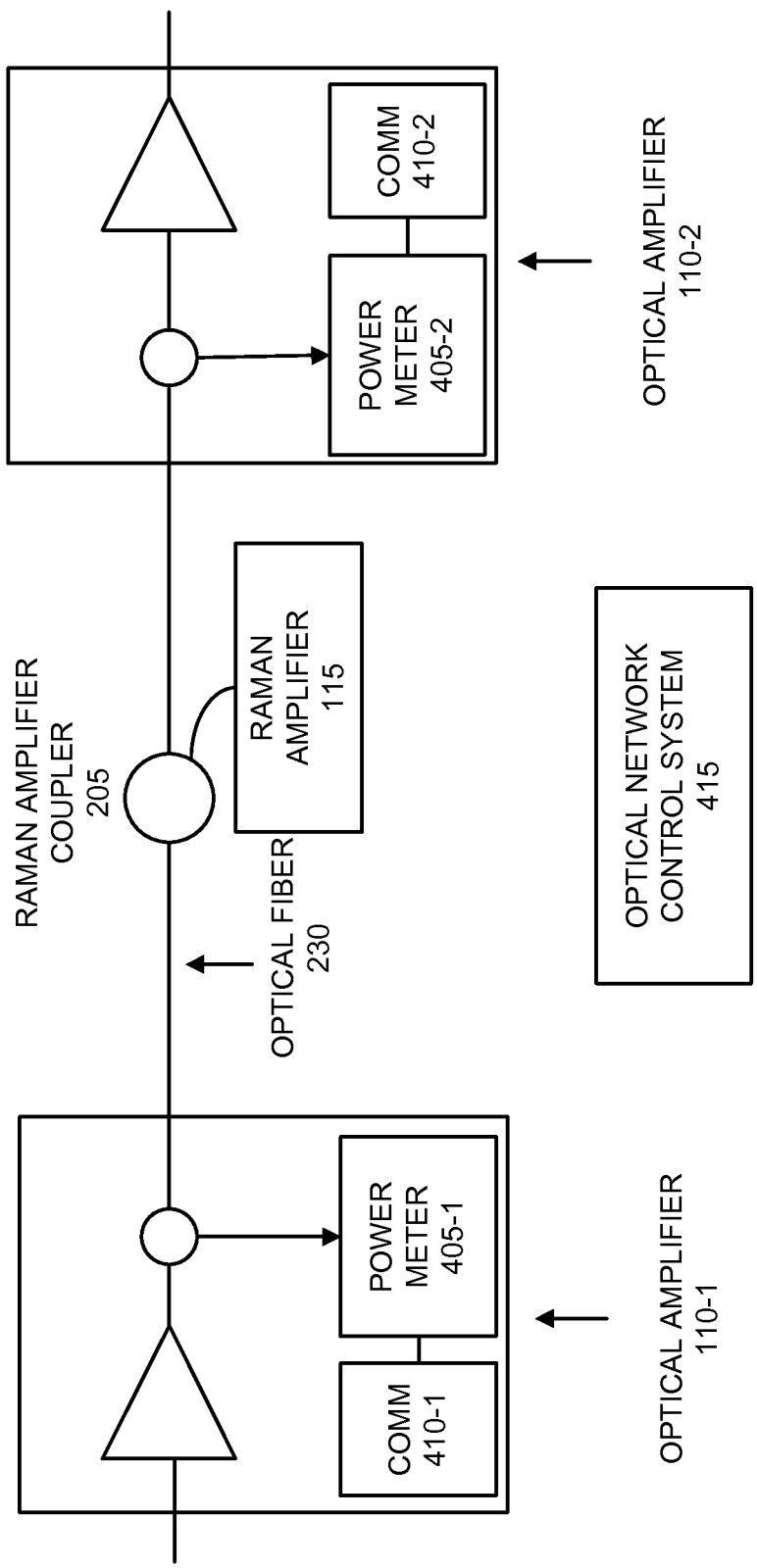
FIG. 4 is a diagram illustrating an exemplary configuration for monitoring a Raman amplifier.

FIG. 4 is a diagram illustrating an exemplary configuration for monitoring a Raman amplifier 115. As illustrated, optical amplifiers 110-1 and 110-2 may include power meters 405-1 and 405-2 (referred to as power meters 405, or individually as power meter 405) and communication systems 410-1 and 410-2 (referred to as communication systems 410, or individually as communication system 410). Additionally, terrestrial optical fiber communication system 100 may include an optical network control system 415.

Power meter 405 may include an optical power meter to detect and measure optical power pertaining to optical signals. Communication system 410 may include, among other components, a transmitter and a receiver, or a transceiver to communicate messages. Communication system 410 may also include a component or logic to generate signal power messages. Optical network control system 415 may include one or more devices that provide(s) various tools to enable network operators, administrators, etc., to monitor and manage terrestrial optical fiber communication system 100.

According to an exemplary process, power meters 405-1 and 405-2 may monitor and measure the signal power pertaining to a light signal propagating along optical fiber 230. Power meter 405-1 may provide communication system 410-1 with a signal power value and power meter 405-2 may provide communication system 410-2 with a signal power value. Communication systems 410-1 and 410-2 may each communicate a signal power value to a node (e.g., an optical network control system (415)) of terrestrial optical fiber communication system 100.

Optical network control system 415 may include a component or logic to compare the respective signal power values to determine whether Raman amplifier 115 is operating properly. For example, optical network control system 415 may calculate a difference signal power value. Optical network control system 415 may determine whether the difference signal power value is an acceptable value based on a comparison with a threshold value or a range of values (e.g., does the difference signal power value fall between an X value and a Y value). If the difference signal power value is not an acceptable value, optical network control system 415 may include a component or logic to generate an alert message that indicates a Raman amplifier 115 is not working properly. The alert message may also indicate which Raman amplifier is not working properly. For example, the message that includes the signal power value, which is sent by communication system 410, may also include an identifier (e.g., an equipment identifier or some other unique identifier) that identifiers power meter 405 and/or optical amplifier 110. In the event that Raman amplifier 115 is determined to not be working properly, administrators, technicians, etc., may know which Raman amplifier 115 may need repairing or replacing. For example, the identifier may be mapped to a particular geographical site or location. Additionally, in the event of a single Raman amplifier 115 failure, it is unlikely that such a failure will negatively impact the performance of terrestrial optical fiber communication system 100 since Raman amplifier 115 is transparent to an optical signal when a Raman pump does not work.

Figure 5:
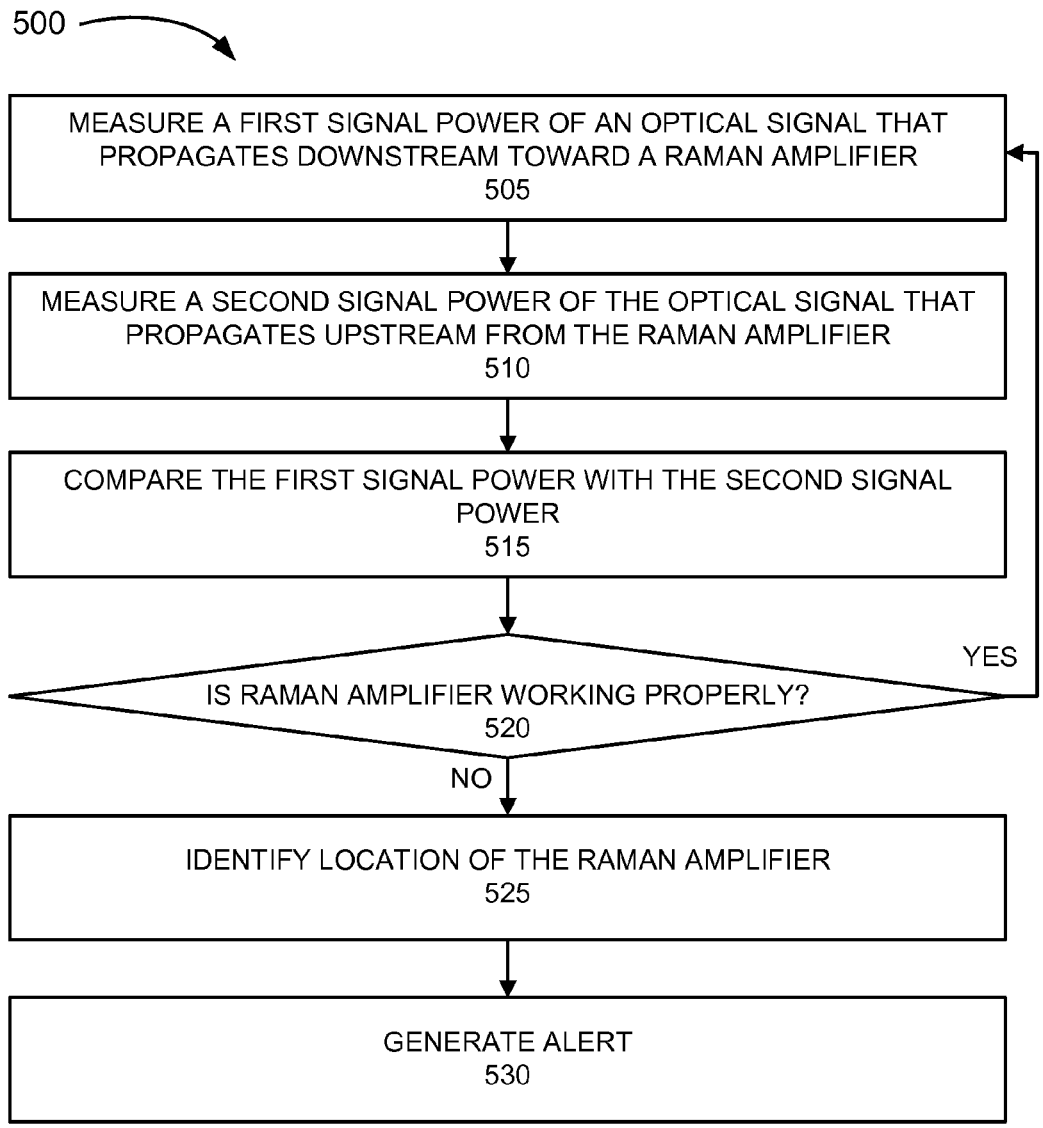
FIG. 5 is a flow chart illustrating an exemplary process for determining whether a Raman amplifier is working properly.

FIG. 5 is a diagram illustrating an exemplary process 500 for determining whether a Raman amplifier is working properly. Process 500 is described in relation to FIG. 4. As illustrated, process 500 may include measuring a first signal power of an optical signal that propagates downstream toward a Raman amplifier (block 505). For example, power meter 405-1 of optical amplifier 110-1 measures signal power of one or more optical signals propagating along optical fiber 230. Similarly, power meter 405-2 of optical amplifier 110-2 measures signal power of one or more optical signals propagating upstream from the Raman amplifier (block 510). Power meters 405 may each provide the measured signal power to communication system 410. Communication systems 410 may generate messages based on the received signal power values.

According to an exemplary implementation, optical amplifiers 110 (e.g., communication systems 410) each transmit a message that includes the measured signal power value to a node of optical fiber communication system 100, such as optical network control system 415. The message may also include an identifier that identifies optical amplifier 110 (e.g., power meter 405), a location associated with optical amplifier 110, an identifier of Raman amplifier 115, and/or a location associated with Raman amplifier 115. The node may compare the first signal power value with the second signal power value (block 515). Based on the result of the comparison, the node may determine whether Raman amplifier 115 is working properly (block 520). For example, the node may calculate a difference signal power value and determine whether the difference signal power value falls within a tolerance signal power value range or, is above/below a tolerance signal power value. If it is determined that Raman amplifier 115 is working properly (block 520-YES), power meters 405 may continue to measure signal power (e.g., periodically, continually, aperiodically, etc.). If it is determined that Raman amplifier 115 is not working properly (block 520—NO), the node identifies Raman amplifier 115 and/or other related information (e.g., location of Raman amplifier) (block 525) and generates an alert (block 530). For example, when the message includes the location of Raman amplifier 115, the node may use this information to generate the alert. When the message does not include the location of Raman amplifier 115, the node may include a mapping of identifiers to locations (e.g., in a table or other data arrangement) to determine the location of Raman amplifier 115. According to an exemplary implementation, the node may send a message to optical amplifiers (e.g., power meters 405) to stop sending messages when it is determined that Raman amplifier 115 is not working properly or after the alert is generated.

Although FIG. 5 illustrates an exemplary process 500 for determining whether Raman amplifier 115 is working properly, according to other implementations, process 500 may include additional operations, fewer operations, and/or different operations than those illustrated in FIG. 5 and described herein.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks is described with regard to the process illustrated in FIG. 5, the order of the blocks may be modified in other implementations. Further, non-dependent blocks may be performed in parallel. Additionally, with respect to other processes described in this description, the order of operations may be different according to other implementations, and/or operations may be performed in parallel.

An embodiment described herein may be implemented in many different forms of software and/or firmware executed by hardware. For example, a process or a function may be implemented as "logic" or as a "component." The logic or the component may include, for example, hardware, a combination of hardware and software, a combination of hardware and firmware, or a combination of hardware, software, and firmware. By way of example, hardware may include a processing system. The processing system may include one or multiple processors, microprocessors, data processors, co-processors, multi-core processors, application specific integrated circuits (ASICs), controllers, programmable logic devices, chipsets, field programmable gate arrays (FPGAs), system on chips (SoCs), programmable logic devices (PLSs), microcontrollers, application specific instruction-set processors (ASIPs), central processing units (CPUs), or some other component that may interpret and/or execute instructions and/or data. Depending on the type of processing system, processing system may be implemented as hardware, or a combination of hardware and software, may include a memory, etc.

The implementation of software or firmware has been described without reference to the specific software code since software can be designed to implement the embodiments based on the description herein. Additionally, a computer-readable medium may store instructions, which when executed, may perform one or more processes and/or functions pertaining to the exemplary embodiments described herein. The computer-readable medium may include a tangible storage medium.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, operation, or instruction described in the present application should be construed as critical or essential to the embodiments described herein unless explicitly described as such.

What is claimed is:

1. An optical communication system comprising:
   an optical fiber connected to a first signal regeneration node located at a first end of the optical fiber and a second signal regeneration node located at a second end of the optical fiber;
   intermediary nodes located between the first signal regeneration node and the second signal regeneration node, wherein one or more pairs of adjacent intermediary nodes each define a span distance along the optical fiber, and wherein each intermediary node of the one or more pairs of intermediary nodes comprise:
      one or more optical amplifiers; and
      a power meter configured to measure signal power of optical signals propagating along the optical fiber;
      a communication logic to:
         generate a message that includes a signal power value; and
         transmit the message to another node;
   one or more Raman amplifiers located within each span distance along the optical fiber, wherein at least one of the one or more Raman amplifiers comprises:
      a case that encases:
         one or more lasers; and
         a temperature controller comprising:
            a temperature sensor to monitor a temperature of the one or more lasers; and
            a temperature regulator to control a temperature of the one or more lasers; and
   the other node comprising:
      a signal power calculating logic to:
         calculate a difference signal power value between signal power values; and
         determine whether the difference signal power value is within a signal power range, or above or below a threshold signal power value; and
      a communication logic to:
         generate a status message indicating that one of the at least one or more Raman amplifiers is not working properly when the difference signal power value does not fall within the signal power range, or is above or below the threshold signal power value.

2. The optical communication system of claim 1, wherein one of the one or more Raman amplifiers is located midpoint in each span distance, and at least one of the one or more Raman amplifiers is located within a span distance between the first signal regeneration node and one of the intermediary nodes and at least one of the one more Raman amplifiers is located within another span distance between the second signal regeneration node and another one of the intermediary nodes.

3. The optical communication system of claim 1, wherein the signal power calculating logic is further configured to identify at least one of:
   the one or more pairs of intermediary nodes from which the messages are received,
   a geographic location of at least one intermediary node of the one or more pairs of intermediary nodes,
   the at least one of the one or more Raman amplifiers, or
   a geographic location of the at least one of the one or more Raman amplifiers.

4. The optical communication system of claim 3, wherein, when generating the status message, signal power calculating logic is further configured to:

generate the status message that includes one or more of:
one or more identifiers pertaining to the one or more pairs of intermediary nodes from which the messages are received,
the geographic location of at least one intermediary node of the one or more pairs of intermediary nodes,
one or more identifiers pertaining to the at least one of the one or more Raman amplifiers; or
the geographic location of the at least one of the one or more Raman amplifiers.

5. The optical communication system of claim 1, wherein the at least one of the one or more Raman amplifiers further comprises:
a fiber connector coupled to an optical fiber, in which a coupling of the fiber connector is water-proof or water-resistant.

6. The optical communication system of claim 1, wherein the at least one of the one or more Raman amplifiers further comprises:
a power connector coupled to a power line, in which a coupling of the power connector is water-proof or water resistant.

7. The optical communication system of claim 1, wherein the first signal regeneration node and the second signal regeneration node each comprise:
one or more transponders configured to:
transmit optical signals to the optical fiber;
receive optical signals from the optical fiber; and
modulate and demodulate optical signals using a dual-polarization sixteen-quadrature amplitude modulation, wherein a length of the optical fiber from the first signal regeneration node to the second signal regeneration node is approximately 2000 kilometers.

8. The optical communication system of claim 1, wherein a length of the optical fiber from one of the intermediary nodes to one of the Raman amplifiers is approximately 40 kilometers, and wherein the at least one of the one or more Raman amplifiers further comprises:
an outer casing that encases the case, wherein the outer casing includes air slots.

9. The optical communication system of claim 1, wherein the optical communication system further comprises:
multiple regeneration nodes connected to the optical fiber;
multiple intermediary nodes located between the multiple regeneration nodes; and
multiple Raman amplifiers located between each span distance along the optical fiber, wherein each of the multiple Raman amplifiers comprises:
a case that encases:
one or more lasers;
a temperature controller comprising:
a temperature sensor to monitor a temperature of the one or more lasers; and
a temperature regulator to control a temperature of the one or more lasers.

10. An optical communication system comprising:
an optical fiber connected to a first signal regeneration node located at a first end of the optical fiber and a second signal regeneration node located at a second end of the optical fiber;
intermediary nodes located between the first signal regeneration node and the second signal regeneration node, wherein one or more pairs of adjacent intermediary nodes each define a span distance along the optical fiber, and wherein the one or more pairs of intermediary nodes each comprise:
one or more optical amplifiers;
a power meter configured to measure signal power of optical signals propagating along the optical fiber; and
communication logic to:
generate a message that includes a signal power value measured by the power meter; and
transmit the message to a control system;
one or more Raman amplifiers located within each span distance along the optical fiber; and
the control system comprising:
signal power calculating logic to:
calculate a difference signal power value between signal power values received in messages from the one or more pairs of intermediary nodes; and
determine whether the difference signal power value is within a signal power range, or above or below a threshold signal power value; and
generate an alert indicating that at least one of the one or more Raman amplifiers is not working properly when the difference signal power value does not fall within the signal power range, or is above or below the threshold signal power value.

11. The optical communication system of claim 10, wherein the first signal regeneration node and the second signal regeneration node each comprise:
one or more transponders configured to:
transmit optical signals to the optical fiber;
receive optical signals from the optical fiber; and
modulate and demodulate optical signals using a dual-polarization sixteen-quadrature amplitude modulation, wherein a length of the optical fiber from the first signal regeneration node to the second signal regeneration node is approximately 2000 kilometers.

12. The optical communication system of claim 10, wherein signal power calculating logic is further configured to identify at least one of:
the one or more pairs of intermediary nodes from which the messages are received,
a geographic location of at least one intermediary node of the one or more pairs of intermediary nodes,
the at least one of the one or more Raman amplifiers, or
a geographic location of the at least one of the one or more Raman amplifiers.

13. The optical communication system of claim 12, wherein, when generating the alert, signal power calculating logic is further configured to:
generate the alert, wherein the alert includes one or more of:
one or more identifiers pertaining to the one or more pairs of intermediary nodes from which the messages are received,
the geographic location of at least one intermediary node of the one or more pairs of intermediary nodes,
one or more identifiers pertaining to the at least one of the one or more Raman amplifiers; or
the geographic location of the at least one of the one or more Raman amplifiers.

14. The optical communication system of claim 10, wherein a length of the optical fiber from one of the intermediary nodes to one of the one or more Raman amplifiers is approximately 40 kilometers.

15. The optical communication system of claim 10, wherein at least one of the one or more Raman amplifiers comprises:
a cabinet that encases an inner case, wherein the inner case encases:
one or more lasers; and a temperature controller comprising:
 a temperature sensor to monitor a temperature of the one or more lasers; and
 a temperature regulator to control a temperature of the one or more lasers.

16. The optical communication system of claim 15, wherein the cabinet includes air slots.

* * * * *